(12) United States Patent
Winick et al.

(10) Patent No.: US 6,404,176 B1
(45) Date of Patent: Jun. 11, 2002

(54) PUSH-PULL AUTO TRANSFORMER

(75) Inventors: Bradley D. Winick, Fort Collins; Robert B. Smith, Loveland; David R. Maciorowski, Parker, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/919,123

(22) Filed: Jul. 31, 2001

(51) Int. Cl.[7] .................................................. G05F 3/04
(52) U.S. Cl. ...................................... 323/305; 315/142
(58) Field of Search ................................. 323/255, 247, 323/305; 315/142

(56) References Cited

U.S. PATENT DOCUMENTS 4,233,541 A * 11/1980 Ferro ........................... 315/248
4,873,618 A * 10/1989 Fredrick et al. .............. 363/37

* cited by examiner

*Primary Examiner*—Shawn Riley
(74) *Attorney, Agent, or Firm*—William J. Streeter

(57) ABSTRACT

A DC-DC voltage converter comprises a controller, two switches, a transformer and two rectifying diodes. The transformer has a first winding, a second winding and a center tap. Input voltage in connected between the center tap and ground. An anode of each diode is connected to the outer ends of the two windings and the cathodes of the two diodes are connected together to provide a positive output with respect to ground. Each switch is connected between an outer end of one windings and ground. The controller generates control signals to turn the switches on and off for limited periods of time in phase opposition to alternately connect the outer ends of the first and second winding to ground to cause current to flow alternatively in one of the windings and induce a voltage in the other winding that is additive to the input voltage, thereby providing an output voltage greater than the input voltage. The converter provides stable operation with good voltage regulation over a wide range of load conditions without the use of feedback.

7 Claims, 2 Drawing Sheets

US 6,404,176 B1

PUSH-PULL AUTO TRANSFORMER

FIELD OF THE INVENTION

The present invention relates to DC-DC voltage converters, and more particularly to DC-DC voltage converters having an output voltage greater than the input voltage.

BACKGROUND OF THE INVENTION

DC-DC voltage converters are known in the art that generate an output voltage that is greater than the input voltage. Such converters utilize input and output capacitors, an inductor, one or more diodes, a switching transistor, and a pulse width modulator, generally implemented by an integrated circuit. Such converters require some type of voltage feedback to regulate the output voltage. The voltage feedback loop requires additional resistors and capacitors and must be designed so that the output voltage remains stable under varying load conditions. These prior art voltage converters usually require other external parts to provide soft start and current limit.

Examples of prior art DC-DC converters include a flyback circuit (FIG. 1), a flyback circuit with transformer isolation (FIG. 2) and a boost circuit (FIG. 3). Flyback circuits inherently have poor voltage regulation. Absent feedback, the output voltage of a flyback circuit tends to increase with decreasing load, and if no load is present, the output voltage may rise to unacceptable levels. The flyback circuit of FIG. 1 incorporates a feedback circuit to compensate for variations in output voltage due to variations in input voltage and varying load conditions, nevertheless, its output voltage is negative with respect to its input voltage, which may require the converter to be isolated from system ground.

The flyback circuit of FIG. 2 incorporates an isolation transformer which overcomes the voltage polarity problem of the circuit of FIG. 1, however, it still exhibits substantially the same poor voltage regulation characteristics.

The boost circuit of FIG. 3 utilizes a series inductance to generate a voltage additive to the input voltage. This circuit also exhibits poor voltage regulation and has the additional drawback that the series inductor must be sized to carry full load current.

SUMMARY OF THE INVENTION

The present invention is a DC-DC converter that does not utilize a feedback loop, yet is stable, operates from no load to full load with good voltage regulation, and provides a "soft" start by initially applying to the load a low voltage substantially equal to its input voltage and then providing a controlled ramp-up to full output voltage. Although there are several alternative embodiments of the present invention, the preferred embodiment uses a field programmable gate array (FPGA) to provide two pulse width modulation (PWM) control signals that alternately drive a pair of semiconductor switches, preferably MOSFETs, between conducting and nonconducting states. Each of the semiconductor switches is connected between ground and one end of the winding of an autotransformer. Input voltage is provided between a center tap of the autotransformer winding and ground. Two rectifying diodes are connected in a common cathode configuration with an anode of each diode being connected to an end of the autotransformer winding. The positive terminal of the output is provided at the common cathode connection of the diodes and the negative terminal at ground.

DETAILED DESCRIPTION

The present invention is a DC-DC converter that provides an output voltage that is higher than its input voltage. Nominally, its output voltage is double its input voltage, so this voltage converter may be referred to as a voltage doubler. The converter of the present invention operates satisfactorily with no load or a varying load. Its output voltage is inherently stable. Moreover, the present invention operates without a feedback loop. Components otherwise needed to provide a feedback loop are not required, resulting in savings in the cost of components and associated costs.

Figure 1:
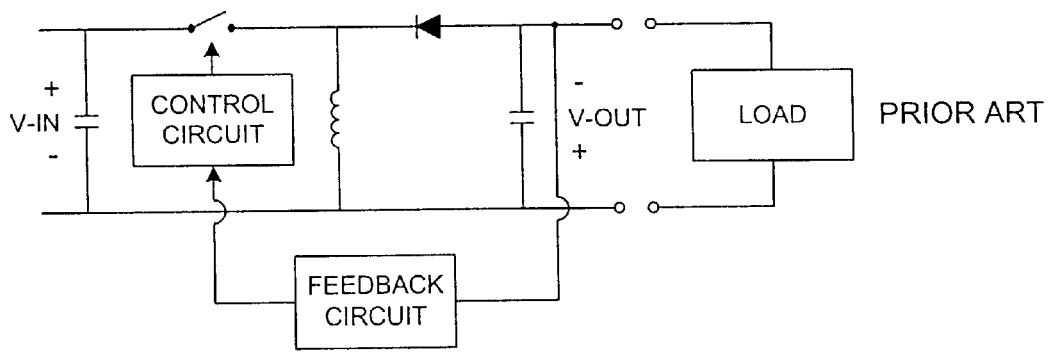
FIG. 1 is a diagram of a flyback circuit.
Figure 2:
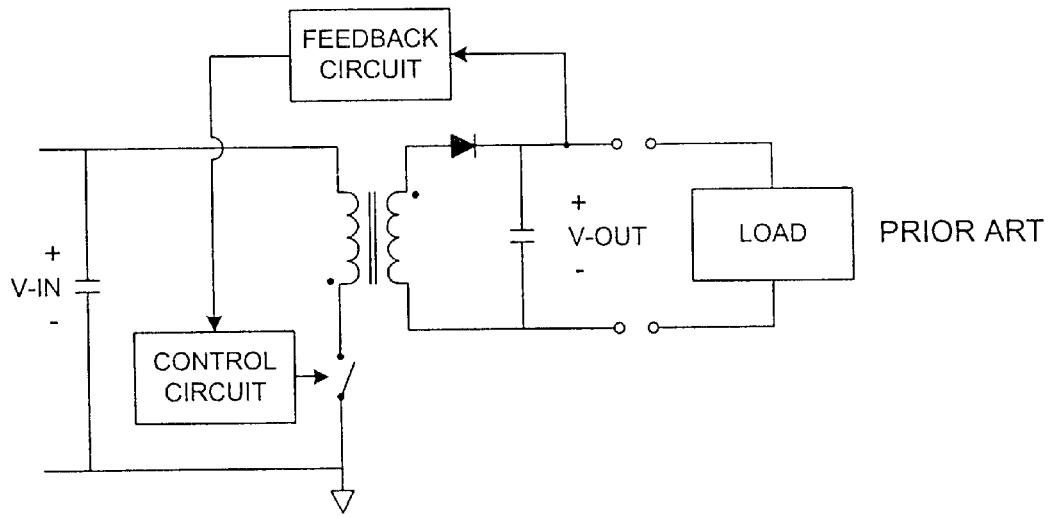
FIG. 2 is a diagram of a flyback circuit with an isolating transformer.
Figure 3:
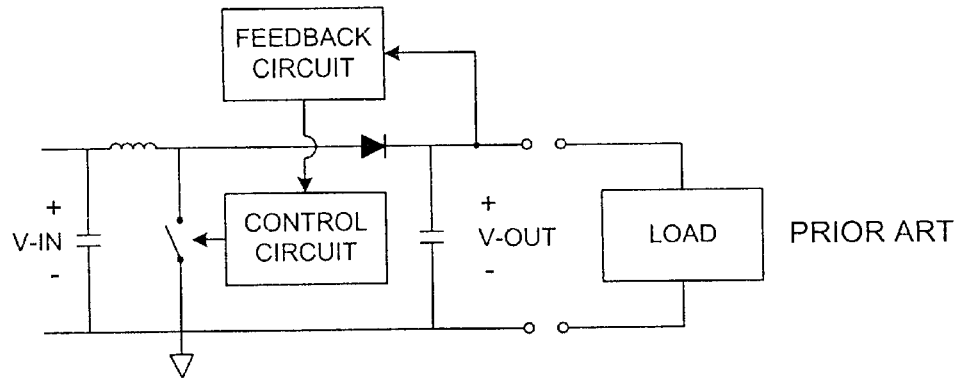
FIG. 3 is a diagram of a boost circuit.
Figure 4:
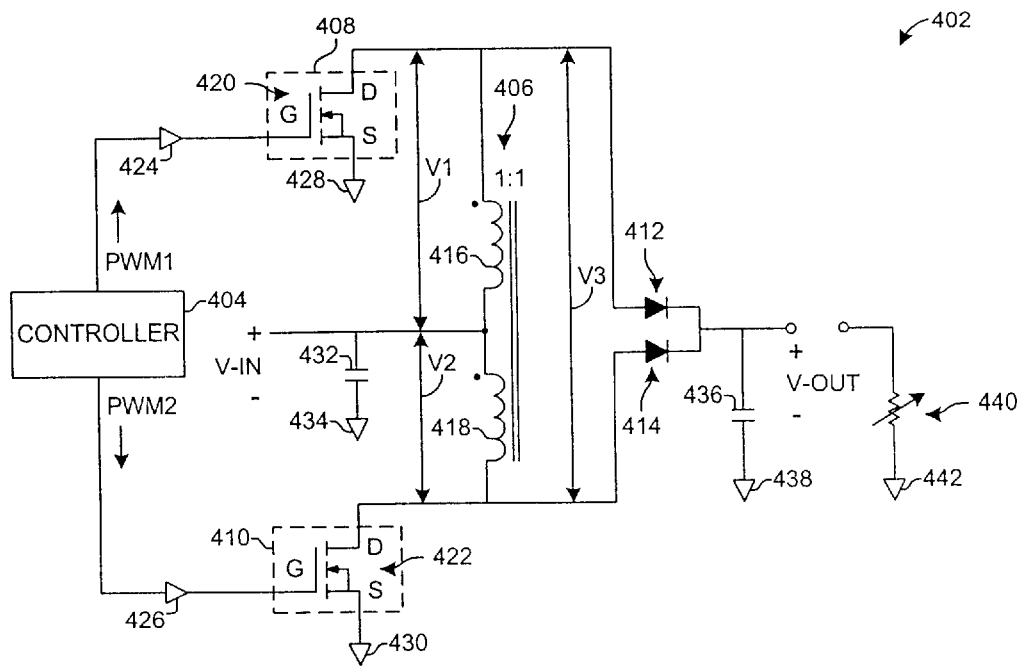
FIG. 4 is a diagram of a voltage converter in accordance with an embodiment of the present invention.

FIG. 4 depicts an exemplary embodiment of the DC-DC converter of the present invention. The converter 402 comprises a controller 404, an autotransformer 406 and two switches 408 and 410. The switches 408 and 410 are connected between the outer ends of windings 406 and 418 of autotransformer 406 and ground, indicated at 428 and 430.

Controller 404 can be any controller configured to produce the appropriate control signals to cause switches 408 and 410 to commutate between conducting and nonconducting states. Preferably, controller 404 is a field programmable gate array (FPGA) configured to generate a first control signal (PWM 1) to control switch 408 and a second control signal (PWM2) to control switch 410.

In its simplest configuration, transformer 406 may be a center tap single winding autotransformer. Alternatively, a two winding transformer comprising windings 416 and 418 having a 1:1 turns ratio may be equivalently connected as an autotransformer with the same result. More complex combinations of windings may be used to produce an output voltage considerably greater than twice the input voltage. An exemplary transformer for use as transformer 406 is the Versa Pak brand transformer, model VP4-0047 made by Coiltronics. This particular transformer has six. windings that may be connected in a plurality of configurations to provide selected output voltages.

Preferably switches 408 and 410 are N-channel enhanced mode metal oxide semiconductor field effect transistors (MOSFETs) 420 and 422, respectively. However, bipolar transistors, insulated gate bipolar transistors (IGBTs), other FETs and other switches may be used.

Rectifying diodes 402 and 404 permit current to flow in one direction, from transformer 406 to output V-OUT. It will be apparent to persons skilled in the art that by reversing the polarity of diodes 402 and 404, the polarity of the input and output voltages will be reversed. In either polarity configuration, rectifying diodes 402 and 414 effectively prevent reverse current flow from V-OUT back toward transformer 406.

The DC-DC voltage converter 402 generates an output voltage that is substantially double that of its input voltage, and is constructed as follows.

The controller 404 provides a first control signal (PWM1) that is connected to the gate of MOSFET 420 via a first driver 424, and a second control signal (PWM2) connected to the gate of MOSFET 422 via a second driver 426. The source of MOSFET 420 is connected to ground at 428 and the source of MOSFET 422 is connected to ground at 430. The drain of MOSFET 420 is connected to the anode of rectifying diode 412 and the outer end of winding 416 of transformer 406. The drain of MOSFET 422 is connected to the anode of the second rectifying diode 404 and the outer end of winding 418 of transformer 406.

The inner ends of windings 416 and 418 are connected together to effectively form an autotransformer having a single winding with a center tap. The positive lead of the input is connected to the center tap and the negative lead of the input is connected to ground at 434. An input filter capacitor 432 is connected between the center tap and ground at 438.

The cathodes of rectifying diodes 412 and 414 are connected together and provide the positive output lead of converter 402. An output filter capacitor 436 has one terminal connected to the positive output lead and has its other terminal connected to ground at 438. V-OUT appears across the positive output lead and ground.

Output capacitor 436 is sized to reduce ripple in V-OUT and to provide hold up time. Input capacitor 432 is sized to absorb ripple in V-IN and to reduce noise. A circuit breaker or fuse (not shown) may be located between V-IN and input capacitor 432 to protect converter 402 in the event of a short or an unacceptable increase in current from V-IN.

Figure 5:
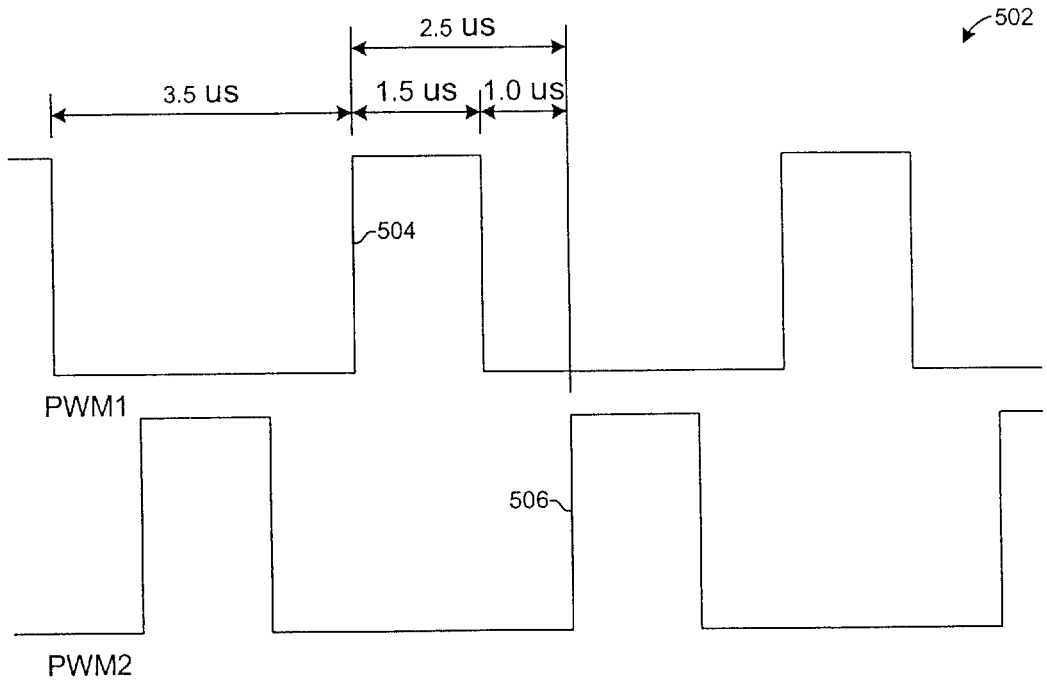
FIG. 5 is a depiction of control signals generated by the controller in the voltage converter of FIG. 4.

Referring to FIGS. 4 and 5, voltage converter 402 operates as follows. In a first example, V-IN is 12 volts, the repetition frequency of control signals PWM1 and PWM2 is 200 kilohertz, and a soft start is not initiated. Controller 404 generates PWM1 at 3.3 volts for 1.5 microseconds ($\mu$s). PWM1 is amplified by driver 424 to a 12-volt signal that turns on MOSFET 420 for 1.5 $\mu$s and then turns MOSFET 420 off. When MOSFET 420 is on, +12 volts is impressed across winding 416 with the center tap positive with respect to the drain of MOSFET 420. The resulting current flow induces a voltage V2 in winding 418 of transformer 406. With a 1:1 turns ratio between winding 418 and winding 416, the voltage V2 that appears across winding 418 is +12 volts, and as indicted by the dots on windings 416 and 418, will be additive to V1. The result is that the voltage at the drain of MOSFET 422 with respect to the drain of MOSFET 420 (which is substantially at ground potential when MOSFET 420 is conducting) is +24 volts, indicated by V3.

The controller 404 waits for 1 $\mu$s after PWM1 has returned to zero volts and then generates PWM2 at 3.3 volts for 1.5 $\mu$s. PWM2 is amplified by driver 426 to a 12-volt signal that turns on MOSFET 422 for 1.5 $\mu$s and then turns MOSFET 422 off. When MOSFET 422 is on, or conducting, +12 volts is impressed across winding 418 with the center tap positive with respect to the drain of MOSFET 422. The resulting current flow induces a voltage VI in winding 416 of transformer 406. With a 1:1 turns ratio between winding 416 and winding 418, the voltage V1 that appears across winding 416 is +12 volts, and as indicted by the dots on windings 416 and 418, will be additive to V2. The result is that the voltage at the drain of MOSFET 420 with respect to the drain of MOSFET 422 (which is substantially at ground potential when MOSFET 422 is conducting) is +24 volts, indicated by V3. After another delay of 1 $\mu$s, PWM1 turns on MOSFET 420 and the foregoing sequence is repeated.

It will be understood that the periodic repetition of the just-described operation results in +24 volts being applied alternately to the anodes of diodes 412 and 414 at a rate of 200 kilohertz. Diodes 412 and 414 operate cooperatively as a half wave rectifier to provide +24 volt pulses at their common cathode connection and across output capacitor 436 at a rate of 400 kilohertz.

It should also be noted that in the foregoing example the output voltage will not be a full 24 volts because of the effects of resistance in windings 416 and 418 and the forward voltage drop of diodes 412 and 414. It. should also be noted that the repetition frequency and the duration of on and off times may be selected to be different from the above example. One consideration in selecting these parameters is the magnetic circuit of transformer 406. Parameters should be selected such that the core of transformer 406 is not driven to saturation. The effects of parasitic inductance and capacitance associated with transformer 406 and parasitic capacitance associated with diodes 412 and 414 should also be considered.

In another example, incorporating a "soft" start, controller 404 delays the generation of PWM1 and PWM2 until some time after V-IN is applied to the input terminals. Without PWM1 and PWM2 being generated, both MOSFET 420 and MOSFET 422 will remain "off" so that neither of the outer ends of windings 416, 418 will be connected to ground. As a result, V-IN will be applied to the output through the series combination of winding 416 and diode 412 operating in parallel with the series combination of winding 418 and diode 414. Thus, the initial turn-on current to the load is shared between windings 416 and 418 and diodes 412 and 414. Again, it should be noted that because of the DC resistance of windings 416 and 418 and the forward voltage drop of diodes 412 and 414, the output voltage V-OUT under these conditions will be slightly lower than the input voltage V-IN.

After a short time delay, the soft start is continued by controller 404 starting PWM1 and PWM2 with minimal "on" times compared to their "off" times and then step by step increasing the "on" times and decreasing the "off" times. Using the former example of a 200 kilohertz repetition frequency for PWM1 and PWM2, the period of repetition is 5 $\mu$s. Thus, by way of example, PWM1 and PWM2 may be initiated with an "on" time of 0.5 $\mu$s and an "off" time of 4.5 $\mu$s. Since these two control signals are initiated 180 degrees out of phase, PWM1 may be thought of as transitioning from low to high at t=0, remaining high until t=0.5 is and then transitioning to low. PWM2 will transition from low to high at t=2.5 $\mu$(one half period after PWM2 transitioned from low to high) and remain high until t=3.0 $\mu$s and then transition to low.

As a next step in the soft start, controller 404 may adjust the "on" and "off" times of PWM1 and PWM2 to 1.0 $\mu$s "on" and 1.5 $\mu$s "off," and after a further time delay may adjust the "on" and "off" times of PWM1 and PWM2 to 1.5 $\mu$s and 1.0 $\mu$s, respectively. In this manner, the output voltage can be "softly" ramped up from a value substantially equal to the input voltage to the full voltage that the aforementioned design considerations will allow.

The voltage converter of the present invention is particularly useful in driving a bank of fans that require approximately 20 volts or more from a 12 volt bus. By initially energizing the fans at the 12 volt level, inrush current is reduced, which in turn minimizes droop on the 12 volt bus. Thereafter, by initiating PWM1 and PWM2 and varying the ratio of their "on" times to their "off" times as described above, the fans will be brought up to full operating voltge softly, avoiding transients that would occur during a hard start.

It will be appreciated by persons skilled in the art that the voltage polarity of the DC-DC converter of the present invention may be reversed merely by reversing the polarity of diodes 412 and 414. This will reverse the polarity of the input voltage V-IN and the polarity of the output voltage V-OUT from the exemplary embodiment of FIG. 4.

It will also be appreciated that the pulse widths, time periods and repetition frequencies described in the foregoing example are exemplary and that other pulse widths, time periods and frequencies may be used without departing from the invention described and claimed herein.

What is claimed is:

1. A DC-DC converter having an input and an output with a common ground comprising:

an autotransformer having a winding, the winding having two ends and a center tap;

two rectifying diodes connected in a common cathode configuration, the anode of each said diode being connected to one of the ends of the winding;

two switches, each of said switches being connected between one of the ends of the winding and ground;

a controller for generating first and second control signals for controlling said first and second switches to turn on and off alternately at a selected repetition frequency;

whereby an input voltage applied between the center tap of the winding and ground will be substantially doubled at an output between the common cathodes of said rectifying diodes and ground.

2. The DC-DC converter of claim 1 further comprising a capacitor connected between the center tap and ground.

3. The DC-DC converter of claim 1 further comprising a capacitor connected between the common cathodes of said rectifying diodes and ground.

4. The DC-DC converter of claim 1 further comprising a first driver connected between said field programmable gate array and said first switch and a second driver connected between said field programmable gate array and said second switch.

5. The DC-DC converter of claim 1 wherein the first and second control signals are pulse width modulation signals and are generated by said controller at a predetermined repetition frequency and in phase opposition to each other.

6. The DC-DC converter of claim 4 wherein the on and off times of the pulse width modulation signals are controlled by said controller.

7. The DC-DC converter of claim 5 wherein to effect a soft start, said controller generates said phase width modulation signals initially to have short on times with respect to the off times and incrementally increases the on times and decreases the off times.

\* \* \* \* \*